(12) United States Patent
Sasaki

(10) Patent No.: US 12,170,601 B2
(45) Date of Patent: *Dec. 17, 2024

(54) NETWORK MANAGEMENT DEVICE, NETWORK MANAGEMENT SYSTEM AND NETWORK MANAGEMENT METHOD

(71) Applicant: Panasonic Intellectual Property Management Co., Ltd., Osaka (JP)

(72) Inventor: Koji Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,861

(22) Filed: Sep. 6, 2023

(65) Prior Publication Data

US 2023/0421470 A1 Dec. 28, 2023

Related U.S. Application Data

(63) Continuation of application No. 17/559,209, filed on Dec. 22, 2021, now Pat. No. 11,784,902, which is a
(Continued)

(30) Foreign Application Priority Data

Jul. 10, 2019 (JP) .................................. 2019-128223

(51) Int. Cl.
*H04L 12/00* (2006.01)
*H04L 43/0817* (2022.01)
(Continued)

(52) U.S. Cl.
CPC ...... *H04L 43/0817* (2013.01); *H04L 43/0823* (2013.01); *H04L 43/0864* (2013.01); *H04L 43/0888* (2013.01)

(58) Field of Classification Search
CPC ............. H04L 43/0817; H04L 43/0823; H04L 43/0864; H04L 43/0888; H04L 43/16;
(Continued)

(56) References Cited

U.S. PATENT DOCUMENTS 5,751,799 A 5/1998 Mori
6,965,573 B1 11/2005 Mizukoshi
(Continued)

FOREIGN PATENT DOCUMENTS

JP 7-231368 8/1995
JP 2001-119434 4/2001
(Continued)

OTHER PUBLICATIONS

International Search Report issued Aug. 4, 2020 in corresponding International Application No. PCT/JP2020/022944.

*Primary Examiner* — Frantz Coby
(74) *Attorney, Agent, or Firm* — Wenderoth, Lind & Ponack, L.L.P.

(57) ABSTRACT

A network management device determines at least one of that an individual error occurs in a target terminal device when a difference between (i) a response time for the target terminal device and (ii) an average response time that is an average value of the response time for each of two or more terminal devices belonging to a group to which the target terminal device belongs is larger than a first predetermined value, and that a group error occurs in a target group when a difference between (i) a current average response time that is an average value of the response time and (ii) a previous average response time that is an average value of a previous response time for two or more terminal devices belonging to the target group is larger than a second predetermined value, the previous response time being immediately prior to the response time.

15 Claims, 14 Drawing Sheets

Related U.S. Application Data continuation of application No. PCT/JP2020/022944, filed on Jun. 11, 2020.

(51) Int. Cl.
*H04L 43/0823* (2022.01)
*H04L 43/0864* (2022.01)
*H04L 43/0888* (2022.01)

(58) Field of Classification Search
CPC ............... H04L 41/065; H04L 41/0893; H04L 41/0631
USPC ....................................................... 709/224
See application file for complete search history.

(56) References Cited

U.S. PATENT DOCUMENTS

| | | |
|---|---|---|
| 7,804,789 B2 | 9/2010 | Craig |
| 8,395,989 B2 | 3/2013 | Campbell |
| 9,059,911 B2 | 6/2015 | Anantharam |
| 10,103,851 B2 | 10/2018 | Callaghan |
| 10,142,203 B2 | 11/2018 | Jadav |
| 11,784,902 B2 * | 10/2023 | Sasaki ................. H04L 43/0864 709/224 |
| 2004/0107252 A1 | 6/2004 | Futa et al. |
| 2004/0174824 A1 | 9/2004 | Ohta et al. |
| 2008/0301217 A1 | 12/2008 | Kandefer |
| 2009/0070483 A1 | 3/2009 | Futa et al. |
| 2010/0020705 A1 | 1/2010 | Umeda |
| 2015/0154257 A1 | 6/2015 | Xiong |

FOREIGN PATENT DOCUMENTS

| | | |
|---|---|---|
| JP | 2004-304755 | 10/2004 |
| JP | 2009-171265 | 7/2009 |
| JP | 2012-186667 | 9/2012 |
| JP | 2014-68283 | 4/2014 |
| JP | 2017-60012 | 3/2017 |
| JP | 2017-220840 | 12/2017 |
| KR | 2247167 | 4/2021 |

\* cited by examiner

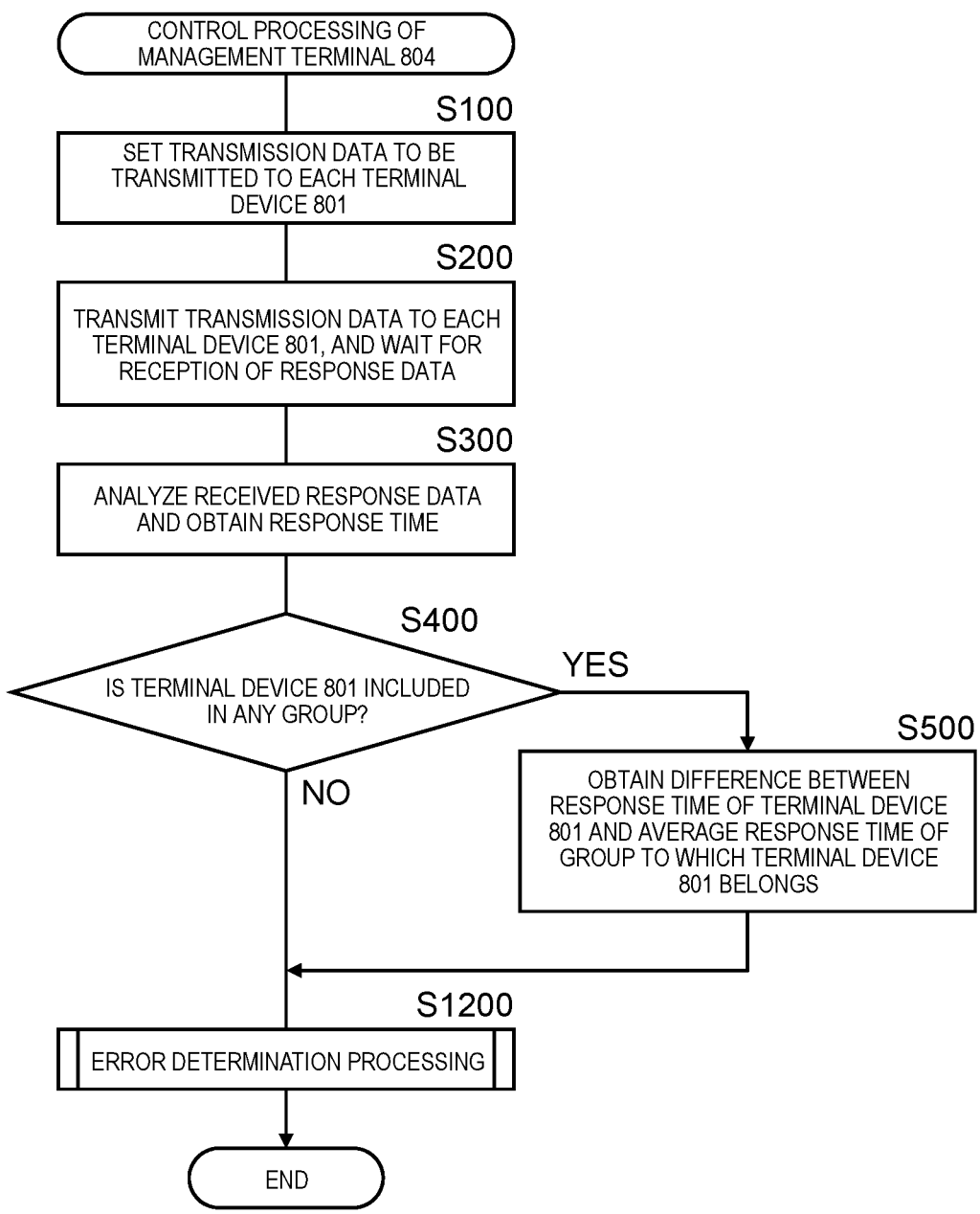

FIG. 9B

| RESPONSE DATA | RESPONSE TIME |
|---|---|
| A1r | tA1 |
| B1r | tB1 |
| ... | ... |

FIG. 10A

| GROUP | TERMINAL DEVICE | RESPONSE DATA | RESPONSE TIME (CURRENT) | RESPONSE TIME (PREVIOUS TIME) |
|---|---|---|---|---|
| A | A1 | A1r | tA1 | tA1p |
| | A2 | A2r | tA2 | tA2p |
| | ... | ... | ... | ... |
| | An | Anr | tAn | tAnp |

FIG. 10B

| GROUP | TERMINAL DEVICE | RESPONSE DATA | RESPONSE TIME (CURRENT) | RESPONSE TIME (PREVIOUS TIME) |
|---|---|---|---|---|
| B | B1 | B1r | tB1 | tB1p |
| | B2 | B2r | tB2 | tB2p |
| | ... | ... | ... | ... |
| | Bm | Bmr | tBm | tBmp |

FIG. 11A

| GROUP | TERMINAL DEVICE | RESPONSE DATA | AVERAGE RESPONSE TIME | DIFFERENCE FROM AVERAGE RESPONSE TIME | DELAY DETERMINATION (THRESHOLD VALUE $\alpha$) |
|---|---|---|---|---|---|
| A | A1 | A1r | tAavg | $\Delta$tA1 | ○ |
| | A2 | A2r | | $\Delta$tA2 | × |
| | … | … | | … | … |
| | An | Anr | | $\Delta$tAn | ○ |

FIG. 11B

| GROUP | TIME | AVERAGE RESPONSE TIME | DIFFERENCE FROM PREVIOUS TIME | DELAY DETERMINATION (THRESHOLD VALUE $\beta$) |
|---|---|---|---|---|
| B | t (CURRENT) | gB(t) | $\Delta$gB(t) | × |
| | t-1 | gB(t-1) | $\Delta$gB(t-1) | ○ |
| | … | … | … | … |
| | t-n | gB(t-n) | $\Delta$gB(t-n) | ○ |

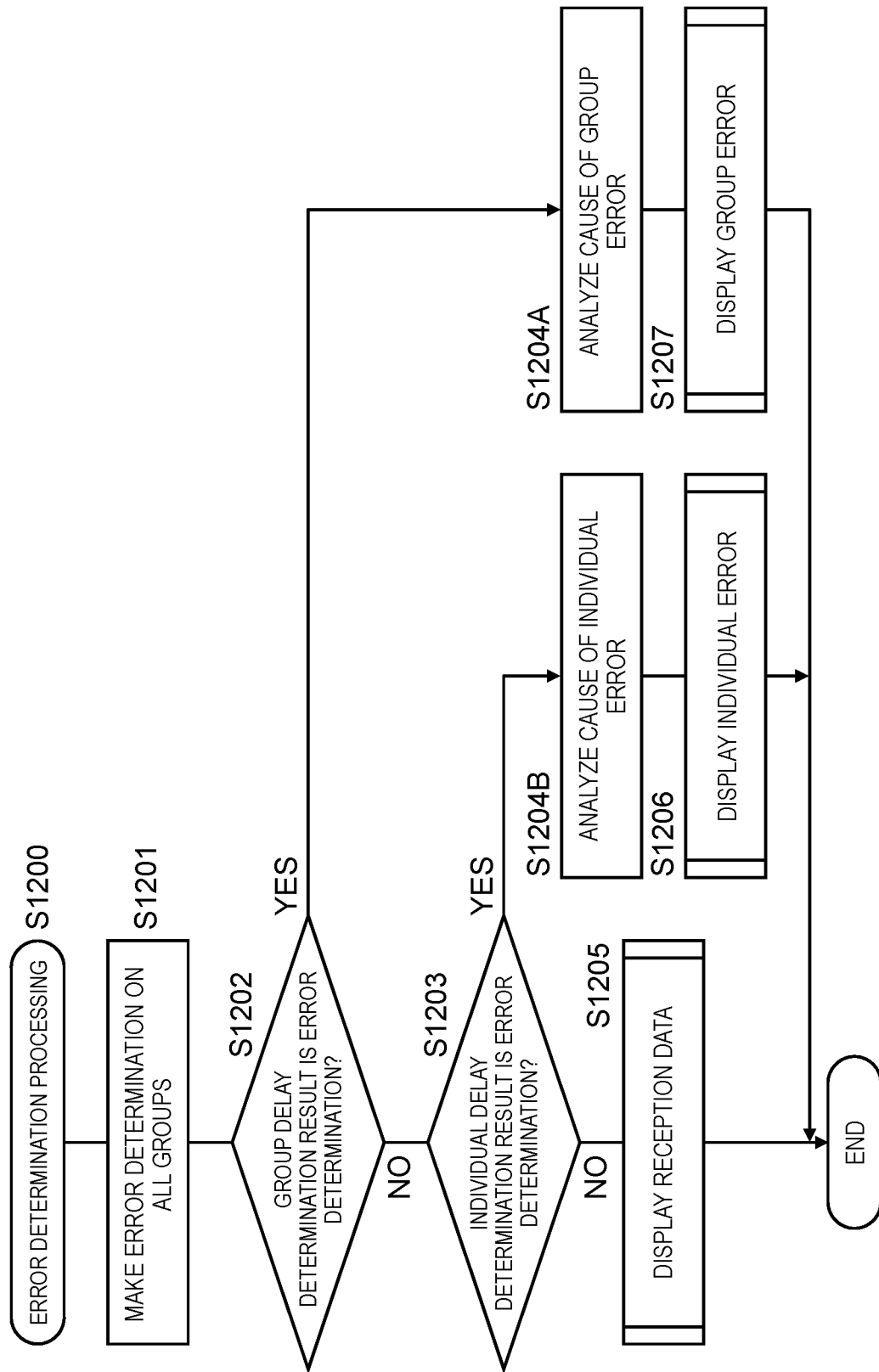

NETWORK MANAGEMENT DEVICE, NETWORK MANAGEMENT SYSTEM AND NETWORK MANAGEMENT METHOD

BACKGROUND

1. Technical Field

The present disclosure relates to a network management device, a network management system, and a network management method. The present disclosure particularly relates to a network management device, a network management system, and a network management method that monitor states of a predetermined network and a plurality of terminal devices connected to the network.

2. Description of the Related Art

Patent Literature (PTL) 1 provides a network failure detection system and a network failure detection device capable of setting a threshold value of an appropriate round trip time (hereinafter, referred to as RTT) in consideration of a propagation delay. The network failure detection device according to PTL 1 groups monitoring target devices having similar RTT values based on the RTT values of the monitoring target devices acquired at a usual time (normal time). The network failure detection device generates a distribution of the RTT values for each group, and determines a threshold value of the RTT of each group based on the generated distribution of the RTT values.

PTL 1 is Unexamined Japanese Patent Publication No. 2014-68283.

SUMMARY

A network management system according to the prior art transmits a message to each of a plurality of terminal devices connected to one network, and compares an RTT value that is a response time of a response message with a predetermined threshold value. When the response time is longer than the predetermined threshold value, a failure is detected in the network and the terminal devices. However, in a case where a failure is detected only based on the response time of each terminal device, it is difficult to determine whether the delay in the response time is caused by a failure occurring in the network or by a failure occurring in one of the plurality of terminal devices. In addition, it is necessary to manually or automatically determine the predetermined threshold value for each terminal device based on statistical information, and thus a preliminary preparation requires additional expense.

The present disclosure provides a network management device, a network management system, and a network management method capable of specifying, when a connection failure occurs between the network management device and a terminal device, whether the failure is derived from a network or from the terminal device.

A network management device according to the present disclosure divides a plurality of terminal devices connected to a network into a plurality of groups, transmits transmission data to the plurality of terminal devices, and receives response data corresponding to the transmission data to acquire connection states of the plurality of terminal devices. The network management device includes at least one of an individual error determiner configured to determine that an individual error occurs in a target terminal device belonging to a group among the plurality of groups when a difference between (i) a response time from a transmission time of transmission data to a reception time of the response data for the target terminal device and (ii) an average response time that is an average value of the response time for each of two or more terminal devices belonging to the group is larger than a first predetermined value, and a group error determiner configured to determine that a group error occurs in a target group to which two or more terminal devices belongs among the plurality of groups when a difference between (i) a current average response time that is an average value of the response time for each of the two or more terminal devices and (ii) a previous average response time that is an average value of a previous response time for each of the two or more terminal devices is larger than a second predetermined value, the previous response time being immediately prior to the response time.

A network management method according to the present disclosure is a method for dividing a plurality of terminal devices connected to a network into a plurality of groups, transmitting transmission data to the plurality of terminal devices, and receiving response data corresponding to the transmission data to acquire connection states of the plurality of terminal devices. The network management method includes measuring, for each of the plurality of terminal devices, a response time from a transmission time of transmission data to a reception time of response data, and at least one of determining that an individual error occurs in a terminal device belonging to a group among a plurality of groups when a difference between (i) the response time for the terminal device and (ii) an average response time that is an average value of the response time for each of two or more terminal devices belonging to the group is larger than a first predetermined value, and determining that a group error occurs in a target group to which two or more terminal devices belongs among the plurality of groups when a difference between (i) a current average response time that is an average value of the response time for each of the two or more terminal devices and (ii) a previous average response time that is an average value of a previous response time for each of the two or more terminal devices is larger than a second predetermined value, the previous response time being immediately prior to the response time.

According to the network management device or the like of the present disclosure, when a connection failure with a terminal device occurs, it is possible to specify whether the failure is derived from the network or from the terminal device.

BRIEF DESCRIPTION OF DRAWINGS

FIG. 2B is a flowchart illustrating an example of control processing of network management device 804 in FIG. 1.

FIG. 9B is a diagram illustrating a table of an example of packet information analyzed by packet analyzer 102 in the network management system of FIG. 1.

FIG. 10A is a diagram illustrating a table of response times and previous response times of terminal devices 801 belonging to group A in the network management system of FIG. 1.

FIG. 10B is a diagram illustrating a table of response times and previous response times of terminal devices 801 belonging to group B in the network management system of FIG. 1.

FIG. 11A is a diagram for describing an operation of error determination processing (individual delay determination) in the network management system of FIG. 1.

FIG. 11B is a diagram for describing an operation of error determination processing (group delay determination) in the network management system of FIG. 1.

FIG. 12 is a flowchart illustrating an operation example of error determination processing in network management device 804.

DETAILED DESCRIPTION

Hereinafter, exemplary embodiments will be described in detail with reference to the drawings as appropriate. However, detailed description more than necessary might be sometimes omitted. For example, the detailed description of already well-known matters and the overlapped description of a configuration substantially identical to the already-described one may be omitted. This is to avoid an unnecessarily redundant description below and to facilitate understanding of those skilled in the art.

Note that the inventor provides the attached drawings and the following description to help those skilled in the art fully understand the present disclosure, and does not intend to limit the subject matter described in the appended claims to these.

First Exemplary Embodiment

A first exemplary embodiment will be described below with reference to FIGS. 1 to 12.

[1-1. Configuration]

Figure 1:
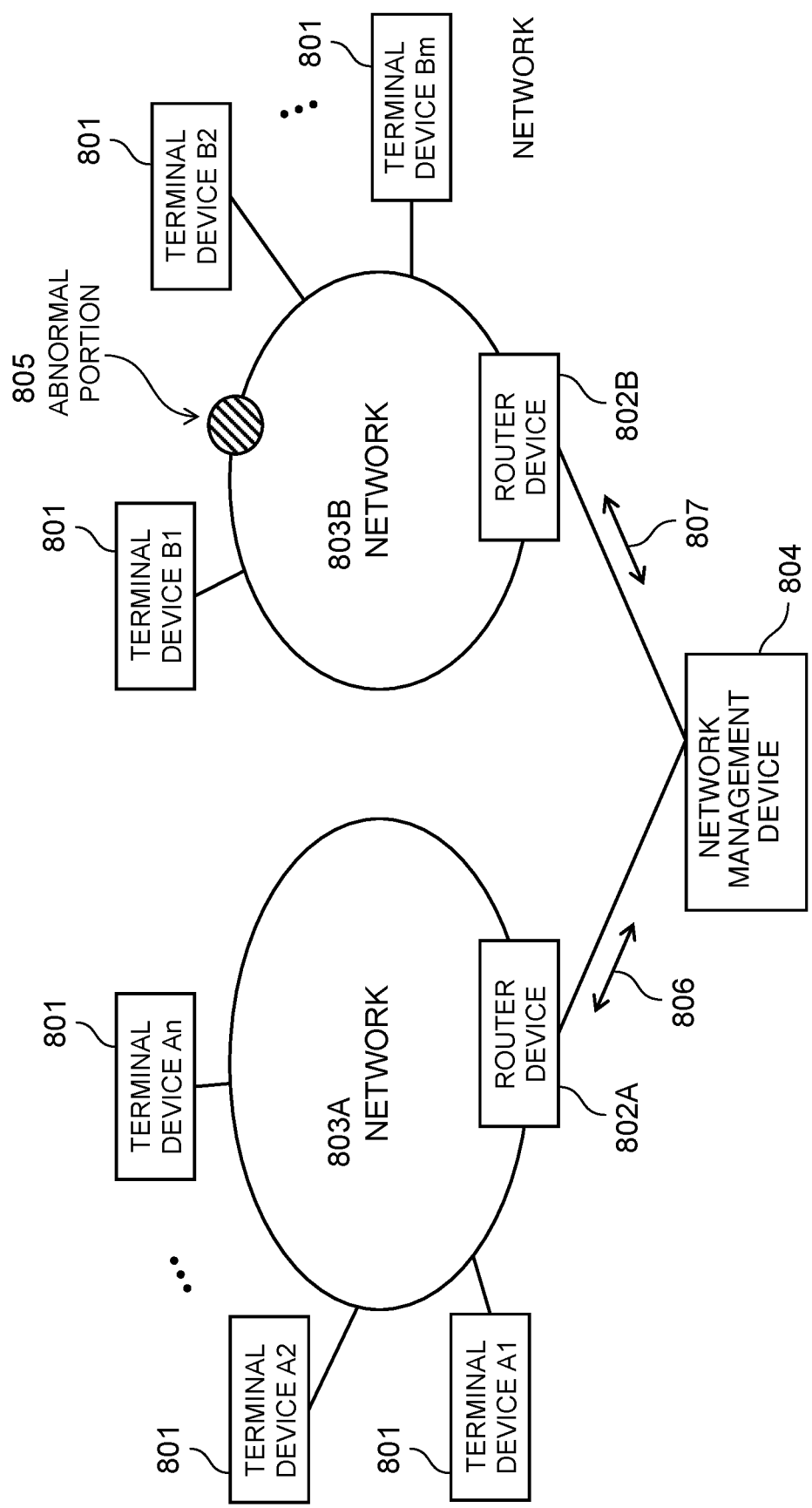
FIG. 1 is a block diagram illustrating a configuration example of a network management system according to a first exemplary embodiment.

FIG. 1 is a block diagram illustrating a configuration example of a network management system according to the first exemplary embodiment. In FIG. 1, the network management system includes a plurality of terminal devices 801, two router devices 802A, 802B, networks 803A, 803B, and network management device 804.

In FIG. 1, the plurality of terminal devices 801 are, for example, terminal devices such as a projector, a display a printer, and a scanner. When receiving a request message, the plurality of terminal devices 801 returns a response message. In FIG. 1, a plurality of n terminal devices 801 connected to network 803A are denoted by A1 to An, and a plurality of m terminal devices 801 connected to network 803B are denoted by B1 to Bm.

Router devices 802A, 802B are communication devices that manage communication paths on networks 803A, 803B, respectively. Terminal devices A1 to An are communicably connected to network management device 804 via network 803A. Terminal devices B1 to Bm are communicably connected to network management device 804 via network 803B.

Network management device 804, which is, for example, a terminal device such as a computer, executes a program stored in an internal or external storage medium to manage a communication state between the plurality of terminal devices 801 and network management device 804 connected to networks 803A, 803B and present the communication state to a user (not illustrated). Abnormal portion 805 where an abnormality has occurred in the communication state is present in network 803B, and a greater delay occurs in a part of the communication path between terminal devices B1 to Bm and network management device 804 than in the case of a normal operation without abnormal portion 805.

Figure 2A:
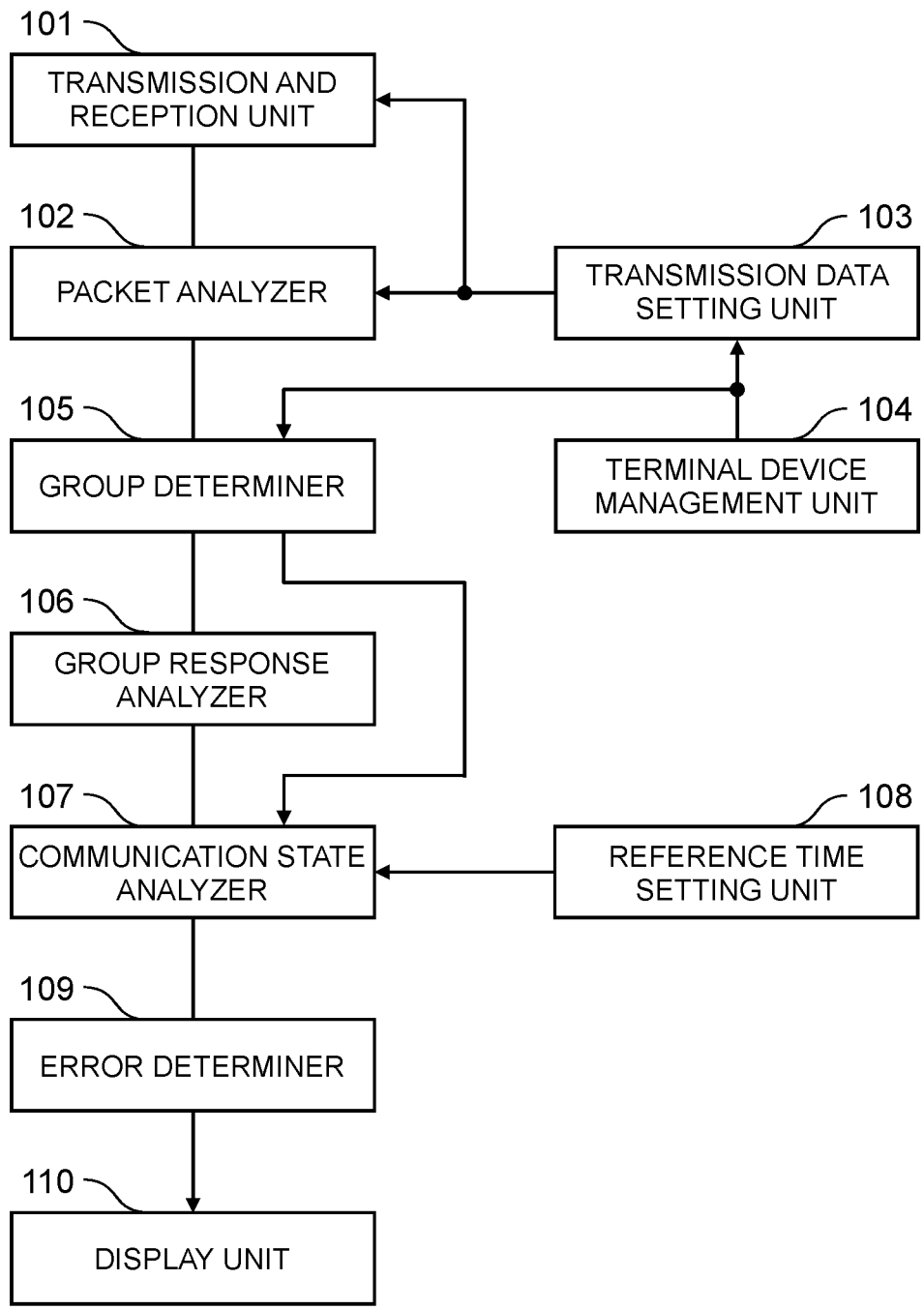
FIG. 2A is a block diagram illustrating a detailed configuration example of network management device 804 in FIG. 1.

FIG. 2A is a block diagram illustrating a detailed configuration example of network management device 804 of FIG. 1. In FIG. 2A, terminal device management unit 104 stores terminal device information for managing the plurality of terminal devices 801 connected to the network by dividing the terminal devices into a plurality of groups. The terminal device information includes, for example, address information such as local Internet Protocol (IP) addresses of terminal devices 801.

In FIG. 2A, transmission data setting unit 103 sets transmission data for acquiring communication states of terminal devices 801 based on the terminal device information of terminal device management unit 104. Transmission and reception unit 101 transmits the transmission data set by transmission data setting unit 103 to the terminal devices 801 and receives response data from terminal devices 801. Packet analyzer 102 associates the response data received by transmission and reception unit 101 with the transmission data set by transmission data setting unit 103, measures the response time from transmission to reception, and then outputs a set of the terminal device information and the response data to group determiner 105.

Group determiner 105 determines whether terminal device 801 corresponding to the response data belongs to the group, based on the information stored in terminal device management unit 104. When terminal device 801 belongs to the group, group determiner 105 further adds group information to the terminal device information and the response data, and outputs the data to group response analyzer 106. When terminal device 801 does not belong to the group, group determiner 105 outputs the input terminal device information and response data, as they are, to communication state analyzer 107. Group response analyzer 106 calculates an average value of the response times of the terminal devices 801 belonging to the group to which terminal device 801 belongs, and further calculates a time difference between the response time of terminal device 801 and the average response time of the group.

Reference time setting unit 108 sets a reference response time of each terminal device 801 and a reference average response time of each group as reference values of the response time of terminal device 801 at the normal time and of the average response time of the group. Communication state analyzer 107 compares the reference response time set by reference time setting unit 108 with the response data of terminal device 801, and analyzes the communication state based on a delay amount from the compared result. Similarly, reference time setting unit 108 analyzes the communication state by comparing the reference average response time set by reference time setting unit 108 with the average response time of the group. Error determiner 109 sets determination information for notifying a user as a warning or an error, based on the analysis result of communication state analyzer 107. Display unit 110 displays an obstacle factor to the user based on the determination result of error determiner 109.

FIG. 2B is a flowchart illustrating control processing of network management device 804. An operation of network management device 804 will be described later.

Hereinafter, a detailed configuration of each component of the network management system of FIG. 1 will be described with reference to FIGS. 3 to 8.

Figure 3:
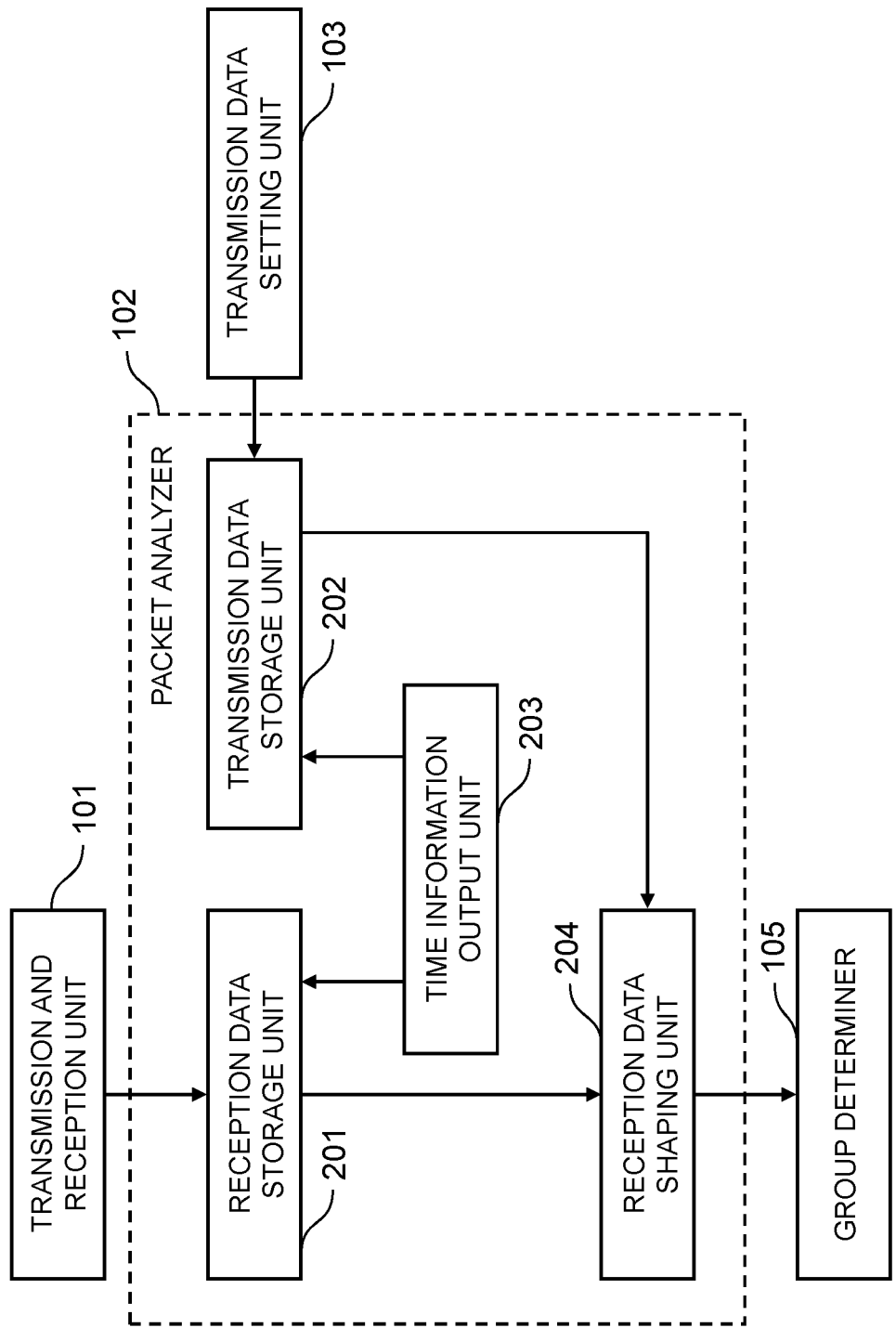
FIG. 3 is a block diagram illustrating a detailed configuration example of packet analyzer 102 in FIG. 2A.

FIG. 3 is a block diagram illustrating a detailed configuration example of packet analyzer 102 in FIG. 2A. In FIG. 3, packet analyzer 102 includes reception data storage unit 201, transmission data storage unit 202, time information output unit 203, and reception data shaping unit 204.

In FIG. 3, time information output unit 203 outputs time information indicating a current time to reception data storage unit 201 and transmission data storage unit 202. Transmission data storage unit 202 adds time information of the time when the transmission data is input (the time when the transmission data is transmitted to terminal device 801) to the transmission data input from transmission data setting unit 103 and saves the transmission data. Similarly reception data storage unit 201 adds information of the time when the response data is input (the time when the response message is received from terminal device 801) to the response data received from terminal device 801 via transmission and reception unit 101, and saves the response data. Reception data shaping unit 204 reads the data stored in reception data storage unit 201 and transmission data storage unit 202, and collectively outputs the data to group determiner 105.

Figure 4:
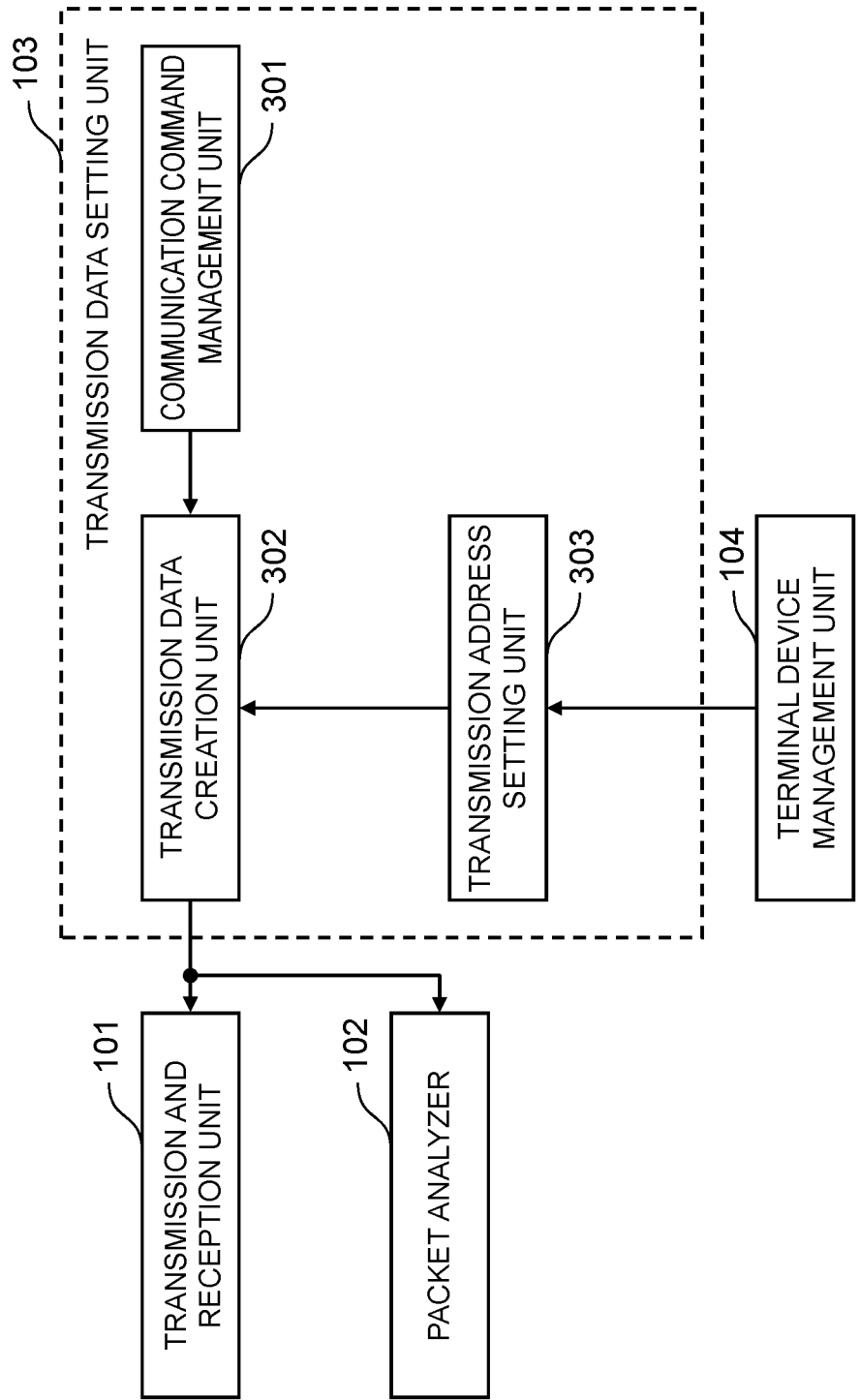
FIG. 4 is a block diagram illustrating a detailed configuration example of transmission data setting unit 103 in FIG. 2A.

FIG. 4 is a block diagram illustrating a detailed configuration example of transmission data setting unit 103 in FIG. 2A. In FIG. 4, transmission data setting unit 103 includes communication command management unit 301, transmission data creation unit 302, and transmission address setting unit 303.

In FIG. 4, communication command management unit 301 stores a group of various commands for transmitting and receiving information to and from terminal device 801. Transmission address setting unit 303 sets an address (IP address) of terminal device 801 as a transmission destination based on the information of each terminal device 801 input from terminal device management unit 104, and outputs the address to the transmission data creation unit 302. Transmission data creation unit 302 creates a request message to be transmitted to terminal device 801 using the address set by transmission address setting unit 303 and the command group stored in communication command management unit 301. Transmission data creation unit 302 then transmits the request message to terminal device 801 via transmission and reception unit 101, and outputs the request message to packet analyzer 102. As for a transmitted packet and a received response message, packet analyzer 102 associates the received response message with terminal device 801 that has transmitted the received response message.

Figure 5:
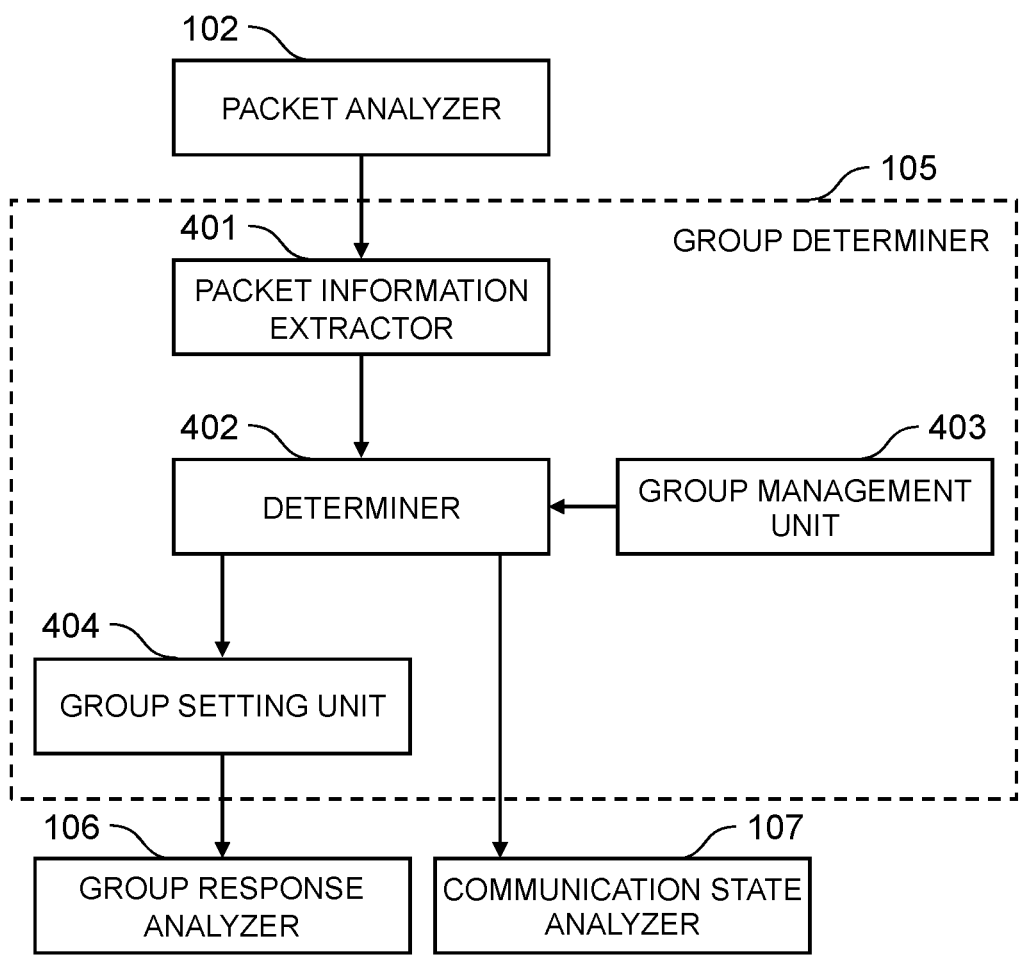
FIG. 5 is a block diagram illustrating a detailed configuration example of group determiner 105 in FIG. 2A.

FIG. 5 is a block diagram illustrating a detailed configuration example of group determiner 105 in FIG. 2A. In FIG. 5, packet information extractor 401 extracts association information about association between the response data and each terminal device 801 that has transmitted the response data, and the information of the response time taken from the transmission to the reception from each of the input response data, and outputs the extracted information to determiner 402. Determiner 402 determines whether each terminal device 801 belongs to any group, based on the association information from group management unit 403. When each terminal device 801 belongs to any group, determiner 402 outputs the extracted association information and response time information to group setting unit 404. Group setting unit 404 adds information on the group to the association information and response time information, and outputs the information to group response analyzer 106. When each terminal device 801 does not belong to any group, group setting unit 404 outputs the association information and the response time information to communication state analyzer 107.

Figure 6:
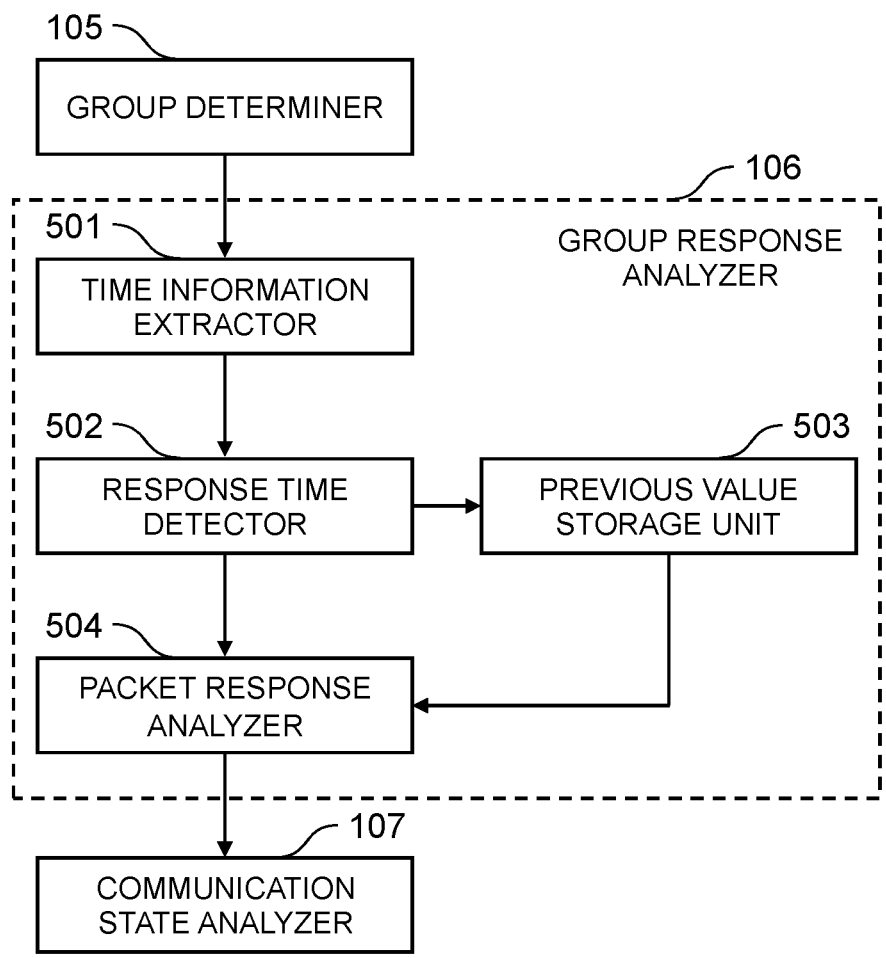
FIG. 6 is a block diagram illustrating a detailed configuration example of group response analyzer 106 in FIG. 2A.

FIG. 6 is a block diagram illustrating a detailed configuration example of group response analyzer 106 in FIG. 2A. In FIG. 6, group response analyzer 106 includes time information extractor 501, response time detector 502, previous value storage unit 503, and packet response analyzer 504.

In FIG. 6, time information extractor 501 extracts time information from the information input from group determiner 105. Response time detector 502 calculates the response time of terminal device 801 based on the time information, and outputs the response time to previous value storage unit 503 and packet response analyzer 504. Previous value storage unit 503 temporarily stores the response time input from response time detector 502 at a previous time, and outputs the stored response time to packet response analyzer 504 as necessary. Packet response analyzer 504 obtains a difference between the response time at the current time and the response time at the previous time, further calculates an average response time of the group, and outputs the response time information to communication state analyzer 107.

Figure 7:
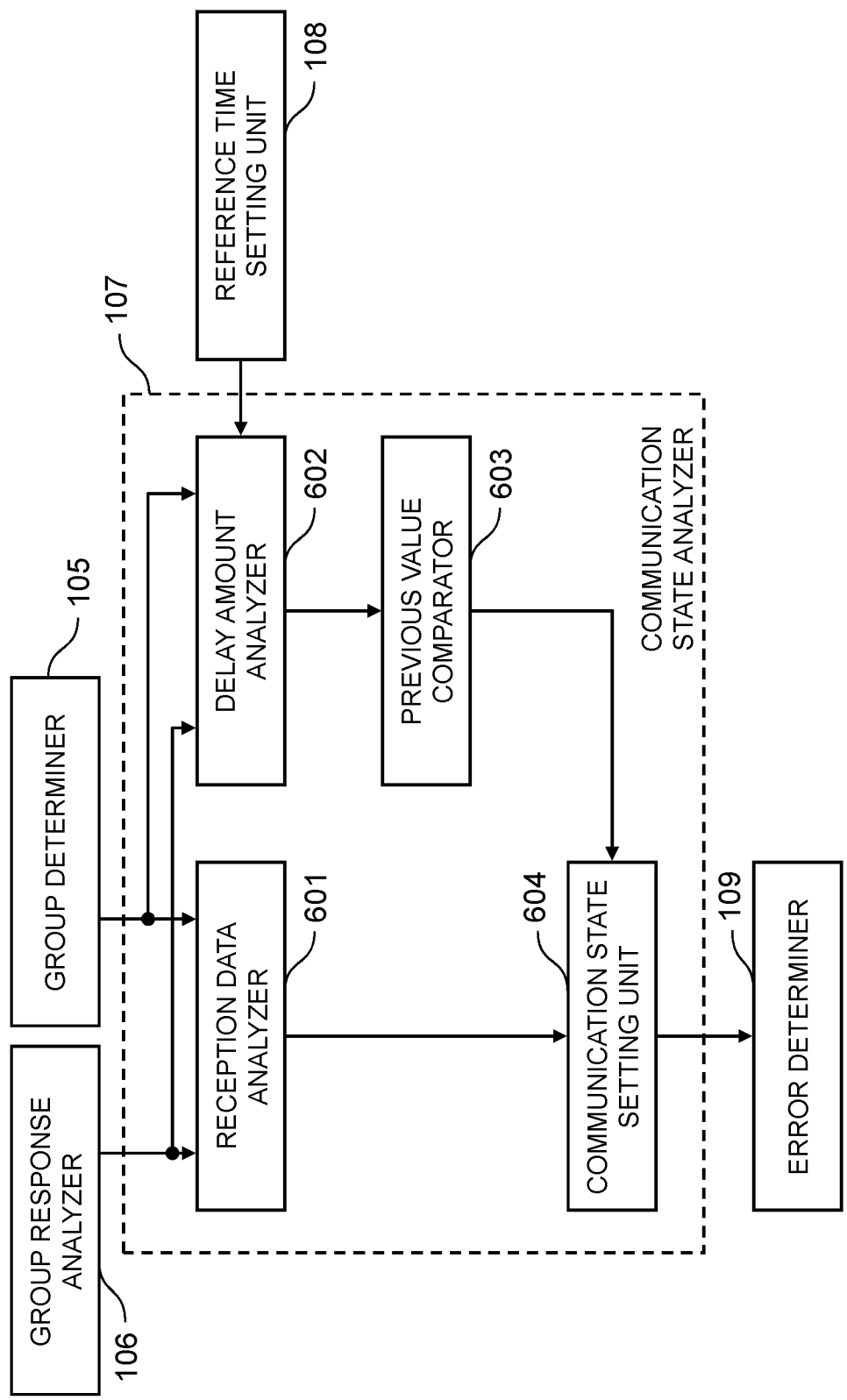
FIG. 7 is a block diagram illustrating a detailed configuration example of communication state analyzer 107 in FIG. 2A.

FIG. 7 is a block diagram illustrating a detailed configuration example of communication state analyzer 107 in FIG. 2A. In FIG. 7, communication state analyzer 107 includes reception data analyzer 601, delay amount analyzer 602, previous value comparator 603, and communication state setting unit 604.

In FIG. 7, reception data analyzer 601 receives information on the response time of terminal device 801 from group response analyzer 106 when terminal device 801 belongs to the group, or from group determiner 105 when terminal device 801 does not belong to the group. Reception data analyzer 601 acquires a current state of terminal device 801 from the input information and outputs the current state to communication state setting unit 604. With respect to terminal device 801 that does not belong to the group, reception data analyzer 601 specifies a state of connection between terminal device 801 and the network based on the input terminal device information.

Figure 8:
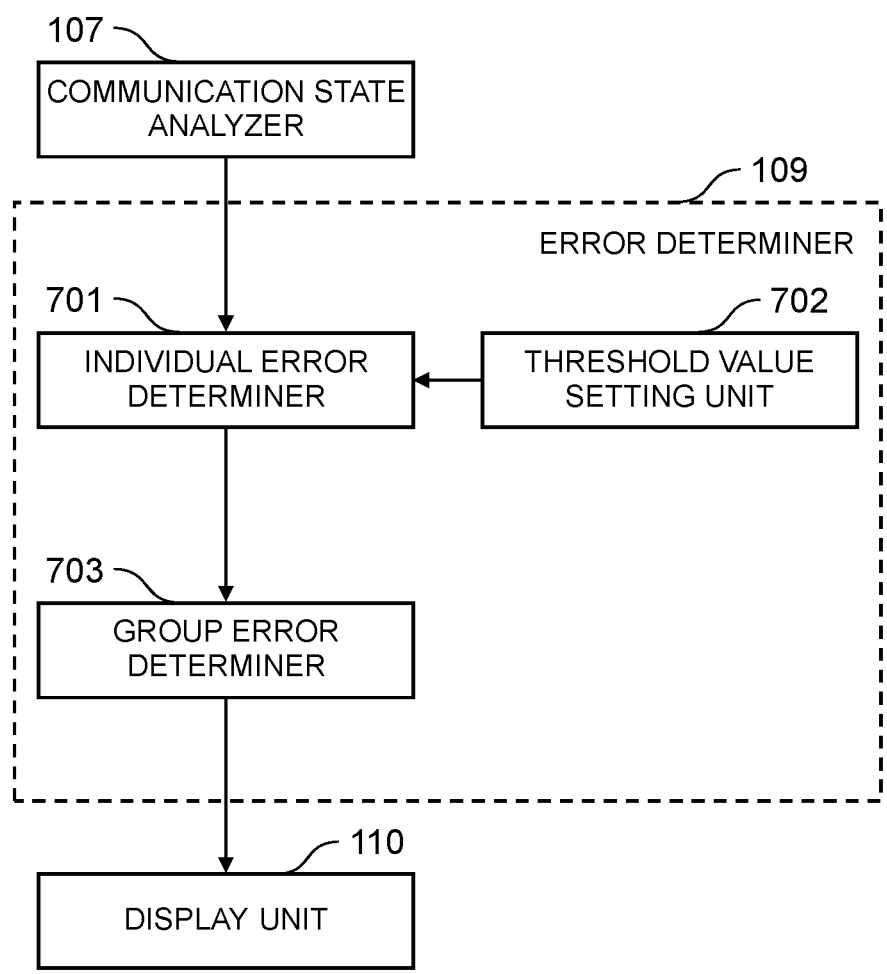
FIG. 8 is a block diagram illustrating a detailed configuration example of error determiner 109 in FIG. 2A.

FIG. 8 is a block diagram illustrating a detailed configuration example of error determiner 109 in FIG. 2A. In FIG. 8, error determiner 109 includes individual error determiner 701, threshold value setting unit 702, and group error determiner 703. In FIG. 8, threshold value setting unit 702 sets a threshold value of the delay amount of the response time of terminal device 801. Individual error determiner 701 determines whether the delay amount of the response time of terminal device 801 is longer than the threshold value response time from threshold value setting unit 702. Group error determiner 703 determines the communication state in units of groups. The threshold value may be a value empirically input by the user, or may be automatically determined based on a variation range of the delay time up to the present.

[1-2. Operation]

An operation of the network management system configured as described above will be described below with reference to FIGS. 2B and 9A to 12.

FIG. 2B is a flowchart illustrating an operation example of control processing in network management device 804 of FIG. 1. In FIG. 2B, network management device 804 performs steps S100, S200, S300, S400, S500, and S1200. In step S100, transmission data setting unit 103 of network management device 804 sets transmission data to be transmitted to each terminal device 801.

In FIG. 2B, in step S200, network management device 804 transmits the transmission data set in step S100 to each terminal device 801, and waits until receiving response data from each terminal device 801. In subsequent step S300, packet analyzer 102, group determiner 105, group response analyzer 106, and communication state analyzer 107 analyze the received response data to acquire various pieces of information such as a response time and an average response time of a group.

In subsequent step S400, a determination is made whether terminal device 801 belongs to any group. When terminal device 801 belongs to any group, the processing proceeds to step S500. When terminal device 801 does not belong to any group, the processing proceeds to the error determination processing in step S1200. In step S500, group response analyzer 106 obtains a difference between the response time of terminal device 801 belonging to a certain group and the average response time of the group to which terminal device 801 belongs. Finally, in step S1200, error determination processing described in detail with reference to FIG. 12 is executed.

Figure 9A:
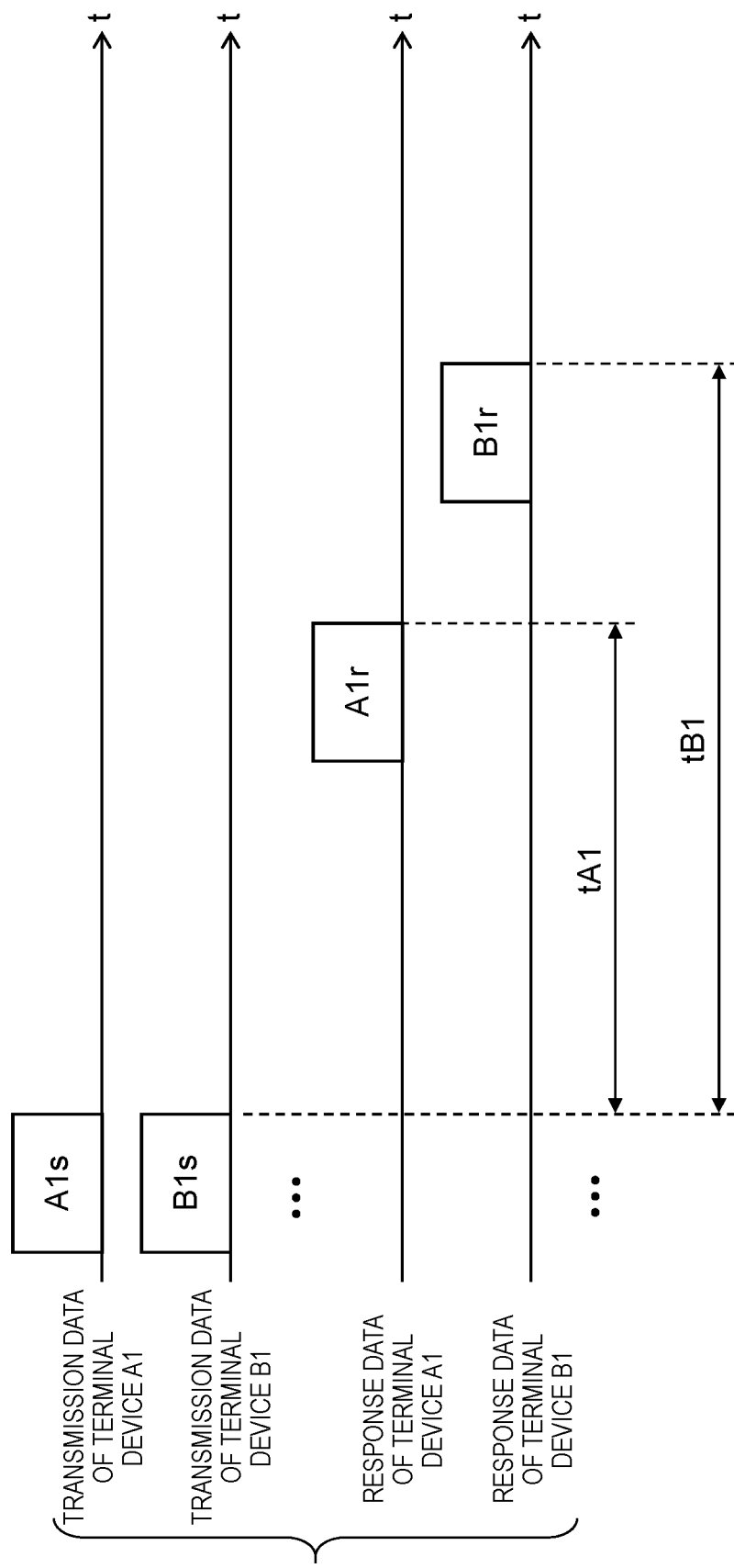
FIG. 9A is a timing chart illustrating an operation example of message transmission and reception in the network management system of FIG. 1.

FIG. 9A is a timing chart illustrating an operation example of data transmission and reception processing in the network management system of FIG. 1. FIG. 9A illustrates transmission and reception of data between network management device 804 and terminal devices A1, B1 in step S200 in FIG. 2B. Here, network management device 804 simultaneously transmits transmission data A1$s$, B1$s$ prompting terminal devices 801 to respond to terminal devices A1 and B1, respectively. Thereafter, network management device 804 receives response data A1$r$ from terminal device A1 after time tA1 from the completion of transmission of transmission data A1$s$, and receives response data B1$r$ after time tB1 from the completion of transmission of transmission data Bis. Times tA1, tB1 between the completion of transmission of transmission data A1$s$, B1$s$, and the completion of reception of response data A1$r$, B1$r$ are referred to as response times of terminal devices A1, B1, respectively.

FIG. 9B is a diagram illustrating a table of an example of information analyzed by packet analyzer 102. As is clear from FIG. 9B, in packet analyzer 102, the response time until reception of response data A1$r$ is represented by "tA1", and the response time until reception of response data B1$r$ is represented by "tB1".

FIGS. 10A and 10B are diagrams illustrating response time data output from group response analyzer 106 to communication state analyzer 107. FIGS. 10A and 10B correspond to group A and group B, respectively. As is clear from FIG. 10A, terminal devices A1 to An are included in group A, and the response times of respective response data A1$r$ to An$r$ have changed from previous response times tA1$p$ to tAn$p$ into current response times tA1 to tAn. Similarly, FIG. 10B illustrates that the response times of response data B1$r$ to Bmr of terminal devices B1 to Bm belonging to group B have changed from previous response times tB1$p$ to tBm$p$ into current response times tB1 to tBm.

FIG. 11A is a diagram illustrating a table of a response state of terminal device 801 calculated in step S500 of FIG. 2B. In FIG. 11A, terminal devices A1 to An, which are included in group A, transmits response data A1$r$ to An$r$, respectively to network management device 804. Further, an average value of response times tA1 to tAn of terminal devices A1 to An is average response time tAavg, and differences between response times tA1 to tAn and average response time tAavg are represented by differential response times ΔtA1 to AtAn, respectively That is, the following equation holds.

$$\Delta tAi = tAi - tAavg (i=1,2,\ldots n)$$

Furthermore, it is assumed that threshold value a has been set by threshold value setting unit 702 of error determiner 109. Results of determining whether the differential response times are smaller than threshold value a by individual error determiner 701 of error determiner 109 are shown as individual delay determination results (in FIG. 11A, "o" when YES, and "x" when NO).

For example, in the case of FIG. 11A, since differential response time ΔtA1 is smaller than a, the delay determination indicates o, but since differential response time ΔtA2 is larger than or equal to a, the delay determination indicates x. Similar individual delay determination results are determined for all the groups.

FIG. 11B is a diagram illustrating another table of the response state of terminal device 801 calculated in step S500 of FIG. 2B. In FIG. 11B, an average response time (corresponding to the current average response time) of group B at current time t is represented by "gB (t)". In addition, "gB(t−1)" that is the average response time at previous time t−1 is saved in previous value storage unit 503 of group response analyzer 106, and the difference ΔgB(t) of the current average response time from the previous average response time (corresponding to the previous average response time) is obtained. That is, the following equation holds.

$$\Delta gB(t) = gB(t) - gB(t-1)$$

Further, assuming that threshold value B is set by threshold value setting unit 702 of error determiner 109, a result of determining whether difference ΔgB(t) is smaller than threshold value B by group error determiner 703 of error determiner 109 is indicated by "o" when YES and by "x" when NO in FIG. 11B as a group delay determination result.

For example, in the case of FIG. 11B, since differences ΔgB(t−1) to ΔgB(t−n) are smaller than threshold value B, the delay determination indicates o, but since difference ΔgB(t) is larger than or equal to threshold value B, the delay determination indicates x. A similar group delay determination result is obtained for each of all the groups. Error determination processing is executed in next step S1200 based on the individual delay determination results and the group delay determination results.

FIG. 12 is a flowchart illustrating an operation example of the error determination processing in network management device 804. In FIG. 12, the error determination processing (step S1200) includes steps S1201 to S1207.

In FIG. 12, first, in step S1201, network management device 804 acquires the group delay determination results and the individual delay determination results for all the groups and all terminal devices 801. Next, in step S1202, network management device 804 determines whether the acquired group delay determination result indicates error (x). When YES, the processing proceeds to step S1204A, and when NO, the processing proceeds to step S1203.

In step S1204A, since the group delay determination result indicates error, it is found that a delay has occurred in the entire group (group B in the example of FIG. 11B). Therefore, a more detailed cause is analyzed. For example, network management device 804 detects a phenomenon such that loss of the response data occurs and the response data is received but retry of transmission and reception is performed, and determines a more detailed cause such as poor connection status with the network or a failure in authentication. After step S1204A, the error determination processing proceeds to step S1207, and the occurrence of the group delay and the more detailed cause analyzed in step S1204A are presented to the user via display unit 110.

In step S1203, a determination is made whether the acquired individual delay determination result indicates error (x). When YES, the processing proceeds to step S1204B, and when NO, the processing proceeds to step S1205.

In step S1204B, since the individual delay determination result indicates error, it is found that a delay occurs only in terminal device 801 (terminal device A2 in the example of FIG. 11A). Therefore, a more detailed cause is analyzed (details are identical to those in step S1204A). After step S1204B, the error determination processing proceeds to step S1206, and the occurrence of the individual delay and the more detailed cause analyzed in step S1204B are presented to the user via display unit 110.

In a case where no error occurs in either of steps S1202 and S1203, in step S1205, a screen on which various pieces of information extracted from the received response data are arranged is created and is presented to the user via display unit 110.

[1-3. Effects and the Like]

As described above, the network management system according to the first exemplary embodiment simultaneously makes the group delay determination and the individual delay determination on terminal devices 801 managed in the group. As a result, when a connection failure occurs between network management device 804 and terminal device 801, the user can specify whether the connection failure is derived from terminal device 801 or networks 803A, 803B, and take an appropriate measure.

Other Exemplary Embodiments

In the first exemplary embodiment, networks 803A, 803B are treated as groups A, B, respectively. However, the method for dividing into a plurality of groups is not limited thereto, and for example, a plurality of networks may be included in one group, or a plurality of terminal devices connected to one network may be classified into a plurality of groups.

Further, in the first exemplary embodiment, only terminal device 801 is managed. However, the management target is not limited to the terminal device, and may be, for example, any device that can be connected to a network such as a router device and return response data for transmission data.

As described above, the exemplary embodiments have been described as examples of the technique of the present disclosure. For that purpose, the accompanying drawings and the detailed description have been provided.

Therefore, in order to illustrate the above techniques, the components described in the accompanying drawings and the detailed description can include not only components essential to solve a problem but also components essential to solve a problem. For this reason, it should not be immediately construed that those unessential components are essential only based on the fact that those unessential components are described in the accompanying drawings and the detailed description.

In addition, the above-described exemplary embodiments are intended to illustrate the technique in the present disclosure, and therefore various changes, replacements, additions, omissions, and the like may be made within the scope of the claims and equivalents thereof.

The present disclosure is applicable to a network management system for a network including a plurality of terminal devices.

What is claimed is:

1. A network management device that divides a plurality of terminal devices connected to a network into a plurality of groups, transmits transmission data to the plurality of terminal devices, and receives response data corresponding to the transmission data to acquire connection states of the plurality of terminal devices, the network management device comprising at least one of:

an individual error determiner configured to determine that an individual error occurs in a target terminal device belonging to a group among the plurality of groups when a difference between (i) a response time from a transmission time of the transmission data to a reception time of the response data for the target terminal device and (ii) a first reference time is larger than a first predetermined value; and a group error determiner configured to determine that a group error occurs in a target group to which two or more terminal devices belongs among the plurality of groups when a difference between (i) a current average response time that is an average value of the response time for each of the two or more terminal devices and (ii) a second reference time is larger than a second predetermined value.

2. The network management device according to claim 1, wherein a data of the first reference time is generated based on the response time for each of two or more terminal devices belonging to the group.

3. The network management device according to claim 1, wherein a data of the second reference time is generated based on the response time for each of the two or more terminal devices.

4. The network management device according to claim 3, wherein a data of the first reference time is generated based on a value that is generated in each of the plurality of groups.

5. The network management device according to claim 3, wherein a data of the first reference time is generated based on a previous response time for each of the two or more terminal devices.

6. The network management device according to claim 1, further comprising a time information output unit configured to output a current time, wherein the individual error determiner or the group error determiner acquires a time when the transmission data is transmitted and a time when the response data is received from the time information output unit, and measures a difference between the time when the transmission data is transmitted and the time when the response data is received as the response time.

7. The network management device according to claim 1, wherein the network management device presets a reference response time for the plurality of terminal devices, and the individual error determiner determines that the individual error occurs when a difference between the reference response time and the response time of the target terminal device is larger than a third predetermined value.

8. The network management device according to claim 1, wherein
the network management device presets a reference average response time for the plurality of groups, and
the group error determiner determines that the group error occurs when a difference between the reference average response time and the current average response time is larger than a fourth predetermined value.

9. The network management device according to claim 1, further comprising a display unit configured to display the acquired connection states including the individual error or the group error.

10. A network management system comprising:
the network management device according to claim 8; and
the plurality of terminal devices.

11. A network management method for dividing a plurality of terminal devices connected to a network into a plurality of groups, transmitting transmission data to the plurality of terminal devices, and receiving response data corresponding to the transmission data to acquire connection states of the plurality of terminal devices, the network management method comprising:
measuring, for each of the plurality of terminal devices, a response time from a transmission time of the transmission data to a reception time of the response data; and at least one of
determining that an individual error occurs in a target terminal device belonging to a group among the plurality of groups when a difference between (i) the response time for the target terminal device and (ii) a first reference time is larger than a first predetermined value; and
determining that a group error occurs in a target group to which two or more terminal devices belongs among the plurality of groups when a difference between (i) a current average response time that is an average value of the response time for each of the two or more terminal devices and (ii) a second reference time is larger than a second predetermined value.

12. A network management method for dividing a plurality of terminal devices connected to a network into a plurality of groups according to claim 11,
wherein a data of the first reference time is generated based on the response time for each of two or more terminal devices belonging to the group.

13. A network management method for dividing a plurality of terminal devices connected to a network into a plurality of groups according to claim 11,
wherein a data of the second reference time is generated based on the response time for each of the two or more terminal devices.

14. A network management method for dividing a plurality of terminal devices connected to a network into a plurality of groups according to claim 11,
wherein a data of the first reference time is generated based on a value that is generated in each of the plurality of groups.

15. A network management method for dividing a plurality of terminal devices connected to a network into a plurality of groups according to claim 11,
wherein a data of the first reference time is generated based on a previous response time for each of the two or more terminal devices.

* * * * *